Aug. 8, 1967 T. E. BRANSCUM 3,334,771
PLASTIC CONTAINER WITH METAL REINFORCED INLET
AND PROCESS OF MAKING SAME
Filed July 6, 1964 3 Sheets-Sheet 1
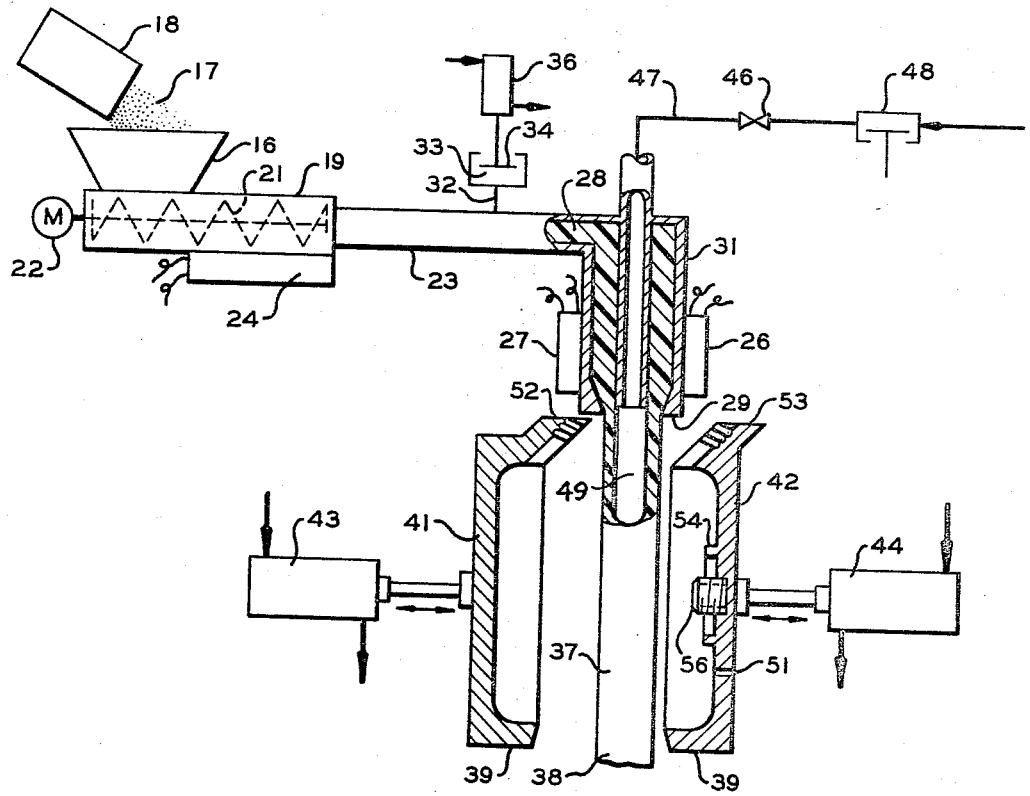
FIG. 1
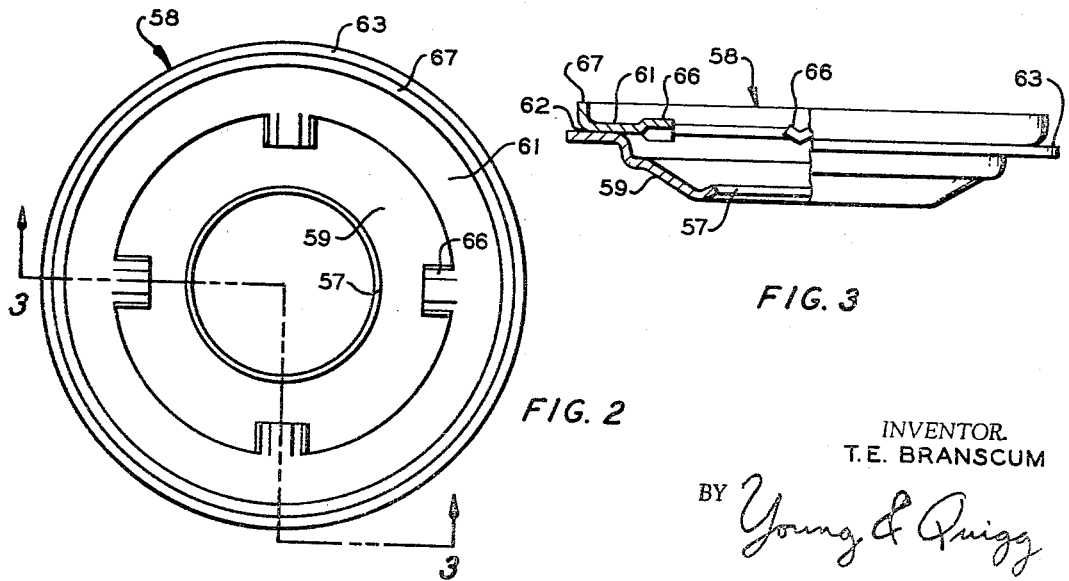
FIG. 2
FIG. 3
INVENTOR.
T. E. BRANSCUM
BY Young & Quigg
ATTORNEYS

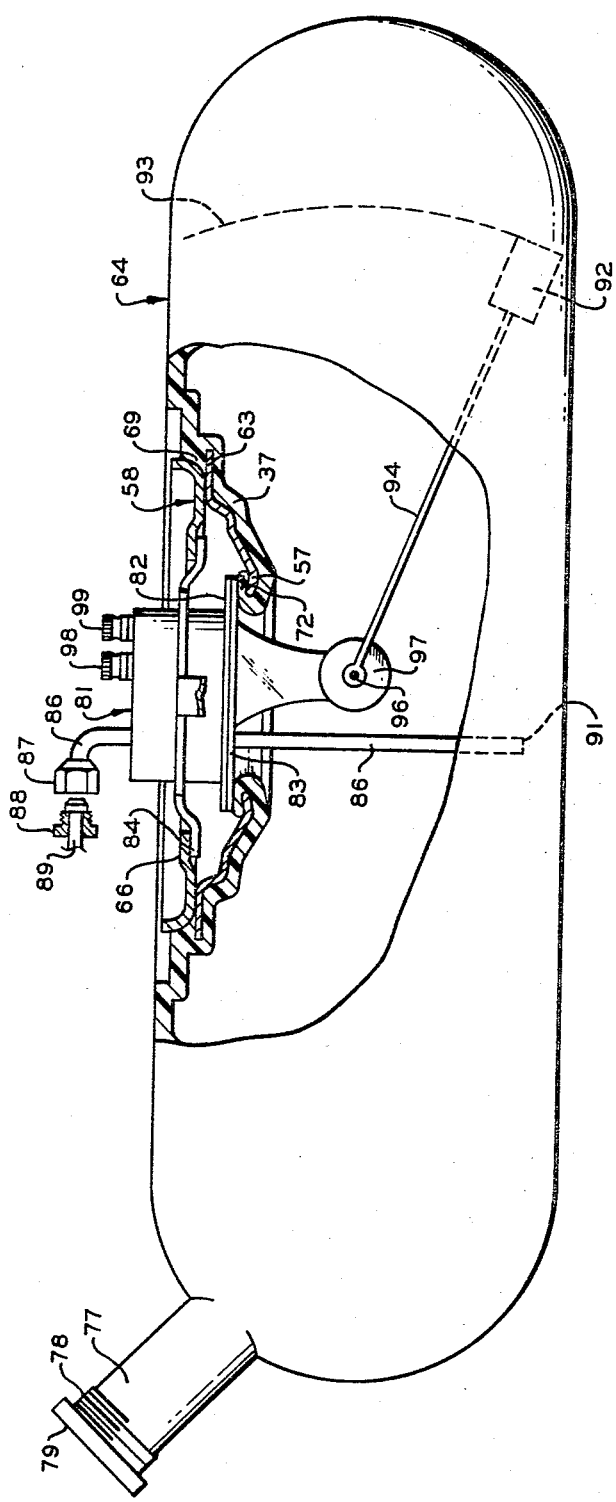
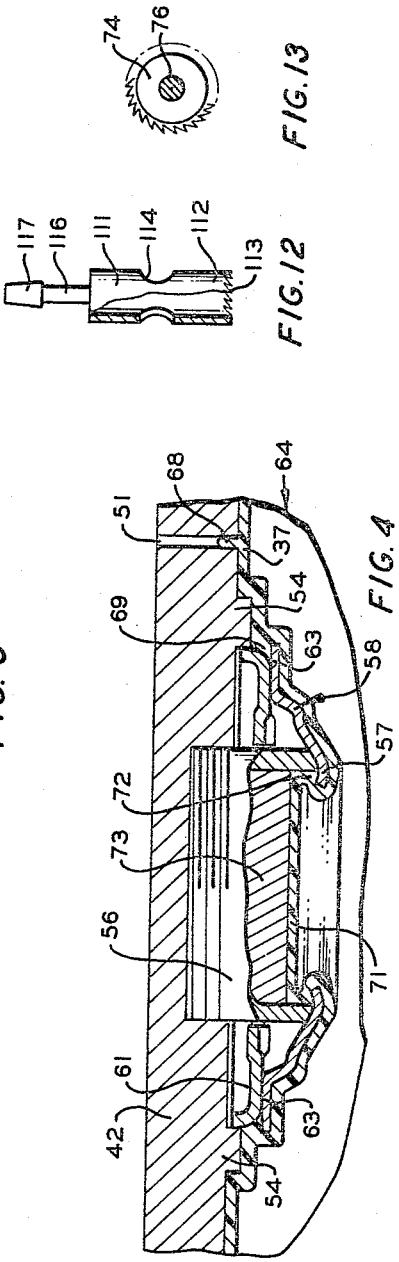

Aug. 8, 1967  T. E. BRANSCUM  3,334,771
PLASTIC CONTAINER WITH METAL REINFORCED INLET
AND PROCESS OF MAKING SAME
Filed July 6, 1964  3 Sheets-Sheet 3

INVENTOR.
T. E. BRANSCUM
BY Young & Quigg
ATTORNEYS

United States Patent Office 3,334,771
Patented Aug. 8, 1967

3,334,771
PLASTIC CONTAINER WITH METAL REINFORCED
INLET AND PROCESS OF MAKING SAME
Tony E. Branscum, Bartlesville, Okla., assignor to Phillips Petroleum Company, a corporation of Delaware
Filed July 6, 1964, Ser. No. 380,543
5 Claims. (Cl. 220—39)

ABSTRACT OF THE DISCLOSURE

A metal insert 58 has an opening surrounded by an inwardly extending metal lip 57, and locking arms 66 spaced from said opening. This insert is positioned in a blow mold 42. A plastic parison 37 is blown inside said blow mold into contact with said insert to form a plastic container in a manner so that some of the parison wall 71 enters the opening and the undercut portion behind the metal lip, forming an overlapping plastic sealing lip 72. The central portion of wall 71 is removed, leaving a plastic container with a metal insert reinforced inlet comprising said opening. A metal closure 82 for said opening may then be inserted, with or without gasket 83, and locked under arms 66 against plastic lip 72, thereby providing a single plastic to metal seal for the inlet of said plastic container. Both the process and the novel article of manufacture produced thereby are claimed as inventions.

---

This invention relates to blow molding thermoplastic material with inserts comprising inlets and/or outlets incorporated in the blow-molded article during the blow molding process. In another aspect, it relates to methods and apparatus for blow molding articles having inserts comprising inlets and/or outlets therein, and to articles of manufacture made of blow-molded plastic containing such inserts of the same plastic, of metal, or of another material. In another aspect, it relates to articles of manufacture, such as gasoline tanks for automobiles, water jugs, and the like, made of plastic and having metal or other material inserts disposed to act as inlet and/or outlet bushings for the same. It also relates to such metal or other material insert inlet and/or outlet connections to a plastic article, such as a gasoline tank, in which the plastic forming the body of the article has been blow molded around the insert in such a way that an integral portion of the wall of said plastic tank forms a sealing gasket or valve seat to which a tank-sealing cap or cover can be sealed directly. In another aspect, it relates to the retention of an insert in the wall of a plastic container by blow molding the plastic container wall around an outwardly-directed shoulder on said insert.

In the prior art, such as U.S. Patent 2,959,812 to Allen, Nov. 15, 1960, articles have been blow molded out of thermoplastic material so as to retain a reinforcing cylinder of metal.

The present inventor is the first to discover that very useful and serviceable inlets and/or outlets formed of metal, or formed of the same or different plastic material, can be inserted in plastic bottles or tanks by blow molding the thermoplastic forming the body of the article into a mold having mounted therein the insert to be received into the plastic wall, and then cutting an opening through the plastic wall in the opening in said insert. Furthermore, he is the first to shape such inserts so that the integral wall of the blow-molded plastic extends into the opening in and around a shoulder in the insert, so that after said opening is cut, a flange of plastic integral with the body of said article extends into said insert and against said shoulder surrounding said opening so that it will act as a gasket or sealing valve seat in cooperation with a suitable cap or cover element secured to said insert so as to seal a fluid into an integral plastic container, without seams or cracks where plastic engages plastic, metal or other material, through which seams or cracks fluid might possibly leak. This invention permits for the first time the provision of an absolutely leak-proof, one-piece, integral plastic gasoline tank for an automobile with suitable inlets and/or outlets and, as such, is an outstanding contribution to the art over such prior art patents as Allen, cited.

One object of this invention is to provide a novel process of forming a one-piece plastic article having an insert of metal, or the same plastic, or other material, with an opening through said insert and through the wall of said article. Another object is to provide such a process in which the plastic wall of said article extends into the opening in said insert past and against a shoulder therein to be disposed as a gasket against which a cap or cover may seal the body of said article. Another object is to blow mold a plastic container around an outwardly-directed shoulder of an insert to retain the same.

Other objects are to provide novel apparatus to practice the processes of the preceding paragraph and to provide novel articles of manufacture made by said processes and/or with said novel apparatus.

Numerous other objects and advantages will be apparent to those skilled in the prior art upon reading the accompanying specification, claims and drawings.

In the drawings:

FIGURE 1 is a schematic elevational view with parts in cross section of the novel blow molding apparatus embodying the present invention.

FIGURE 2 is a plan view of one of the metal inserts which may be used in the present invention.

FIGURE 3 is an elevational view with parts in cross section taken along the line 3—3 of FIGURE 2 looking in the direction indicated.

FIGURE 4 is a fragmentary cross-sectional view of a blow mold containing a support for the insert of FIGURE 2, the insert itself, and a blow-molded plastic gasoline tank blown into and around said insert.

FIGURE 5 is an elevational view with parts broken away to show details of construction of a finished article of manufacture embodying the present invention, namely, a gasoline tank containing the metal insert of FIGURE 2 made in the mold of FIGURE 1 with the insert support of FIGURE 4.

FIGURE 12 is an elevational view with part broken away of a cylindrical core saw suitable for cutting an opening through the plastic wall covering the opening in the inserts of FIGURES 7, 10 and 11.

FIGURE 13 is a plan view with the shaft in section of a disc saw suitable for cutting out the opening in the plastic wall extending into the opening in the insert in FIGURES 4 and 5.

Figure 6:
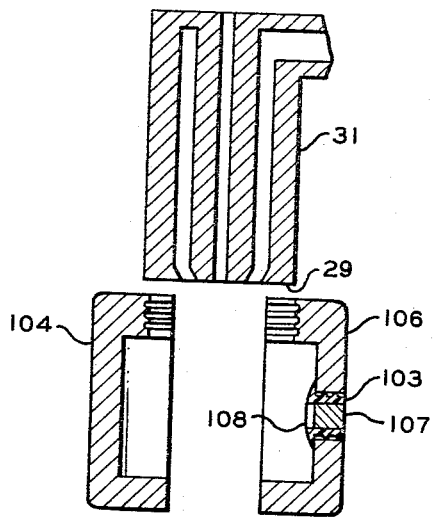
FIGURE 6 is a cross-sectional view of a second modification of the mold, insert support and insert.

FIGURE 1 shows a blow molding machine embodying the present invention comprising a hopper 16 into which granules 17 of thermoplastic material may be poured from a container 18. By thermoplastic material it is intended to cover all materials which soften when heated, and harden again when cooled to atmospheric temperature or to within several hundred degrees above atmospheric temperature, which are suitable for blow molding. The best known of these materials are solid polyethylene, solid polypropylene, and solid polystyrene, and mixtures thereof, but the present invention is not limited thereto, as any of the materials used in blow molding in the prior art may be employed in the present invention. The term blow molding is intended to cover forming a hollow object inside a mold by expanding the same outwardly against the wall of the mold by superior internal fluid pressure, regardless of whether the superior pressure is produced by having a superatmospheric pressure on the interior of the article or by having a subatmospheric pressure in the mold around the exterior of the article, thus covering both pressure and vacuum molding. For purposes of illustration, the preferred system of employing simple superior air pressure inside the article is shown in the drawings.

While other obvious equivalent means can be employed to produce a suitable hollow, heat-softened parison from the thermoplastic material 17, it is preferred to feed the material 17 from hopper 16 into an extruder 19 in which a helical screw 21 driven by motor 22 forces material 17 into pipe 23 as a substantially homogeneous, unitary, heat-softened mass which has been heated by heater 24 and may be further heated by such heaters as 26 and 27. It is preferable to feed this material 28 into pipe 23 continuously by screw 21 and then extrude the same from nozzle 29 of die head 31 intermittently at timed intervals by withdrawing some material 28 through pipe 32 into surge chamber 33 during most of the cycle and then forcing the same back through pipe 32 by means of piston 34 driven by hydraulic motor 36 at that short time in the cycle when it is desired to extrude a parison 37.

Hollow parison 7 of heat-softened plastic material is extruded from nozzle 29 and hangs downward as shown with its lower end 38 below the bottom edges 39 of the halves 41 and 42 of the blow mold. When this parison 7, preferably of cylindrical shape, is hanging in the position shown, the two halves 41 and 42 of the blow mold are shoved together by means of hydraulic motors 43 and 44, the bottom portions 39 mashing the end 38 of parison 37 together, sealing the bottom of the depending cylinder 37. At this time in the cycle, valve 46 in air line 47 opens, allowing compressed air from compressor 48 to flow into space 49 inside parison 37. The pressure in space 49 becomes greater than the atmospheric pressure in mold halves 41 and 42 and forces the walls of the parison 37 outward into contact with walls 41 and 42 forming a blow-molded article. Sufficient leakage may occur between the halves 41 and 42 to allow this inflation of parison 37 into contact with the walls of the mold or, if necessary, suitable small holes 51 may be provided in one or both mold halves 41 and 42 to allow the escape of air from the space between parison 37 and the mold. The mold halves 41 and 42 are cooled by radiation into the surrounding air sufficiently so that when parison 37 contacts the walls it will cool to a temperature at which the thermoplastic material becomes stable in shape to such extent that the finished article may be removed, at which time the top of parison 37 above the tops 52 and 53 of mold halves 41 and 42 and blow nozzle 29 may be cut off with a suitable knife (not shown).

If mold halves 41 and 42 do not cool sufficiently by radiation, they may be provided with suitable indirect heat exchange water coolers (not shown).

The mold halves 41 and 42 are then moved apart by motors 43 and 44 and the finished container formed from parison 37 is removed from the mold. At this point in the cycle piston 34, which has been rising at a speed sufficient to increase the volume of surge chamber 33 to accommodate the material being extruded by screw 21, stops rising and is reversed in direction by motor 36 to extrude another length of parison 37 to the point where its lower end 38 extends below the bottom 39 of the mold, upon which piston 34 starts to rise at the proper rate to accommodate for the material being forced into pipe 23 by screw 21 and parison 37 stops moving. At this point in the cycle, mold halves 41 and 42 are forced together and the cycle is repeated.

The present invention improves the operation of blow molding as described by providing for the positioning of inserts in the walls of a plastic container produced by such blow molding. The insert, such as the one shown in FIGURES 2 and 3, may be positioned on the wall of mold half 42 between guide ring 54 and central guide 56, either by hand while the mold halves are open in the position shown in FIGURE 1 or by mechanical insertion device (not shown) (such as 5 of Allen 2,959,812, cited). When the insert is made of a diamagnetic material, such as steel, it is preferred to hold the same in place by making central guide 56 out of magnetic material which will attract and hold the insert in position, but from which the insert can readily be removed by force when the blow-molded finished container containing the insert is removed from the mold.

FIGURES 2 and 3 show an insert which is particularly valuable when used in the outlet of a thermoplastic blow-molded gasoline tank for an automobile. While these inserts of the present invention need not necessarily be made of metal, it is preferred to make this particular insert out of steel, which enables annular lip 57 to be attracted by magnet 56. This insert, generally designated as 58, comprises an inner annular washer 59 (inner meaning directly toward the inside of the gasoline tank) and an outer annular washer 61 secured together at 62 by any means, such as brazing. The inner washer 59 has an outwardly-directed shoulder 63 (outwardly directed relative to the gasoline tank generally designated as 64 in FIGURE 5). Ring 61 has a plurality of at least three inwardly-directed locking arms 66 and an outwardly-directed annular flange 67.

FIGURE 4 is an enlarged fragmentary view of the portion of mold half 42 containing ring 54 and central guide 56 of FIGURE 1, but at a different portion of the cycle after parison 37 has been blown out into contact with mold half 42 and insert 58, thereby forming tank 64. It will be noted that a very small portion of plastic 37 may extend into hole 51 to form a pip 68, because the walls of 42 cool the same as it enters hole 51, and hole 51 is small in diameter, being merely to allow air to escape. On the other hand, a portion of parison 37 has been forced at 69 to a position outside of outwardly-directed shoulder 63 and has hardened into position, firmly securing insert 58 to tank 64. Also, a portion 71 has been blown through opening 57 into a portion outside the lip 57 and hardened in that position so that it forms additional means for securing insert 58 to tank 64. Central guide 56 is made of magnetic material, preferably having an opposite magnetic pole at each axial end thereof, and is screw-threaded into mold half 42 and holds diamagnetic insert 58 into position by magnetism during molding. However, when mold halves 41 and 42 are separated it is easy to pull insert 58 away from magnet 56 because the insert is secured by overlapping portions 69 and 72 of the plastic 37 which has cooled to a stable condition at the time of its removal as tank 64.

Plug 73 may be of any suitable metal, as it merely is filling space inside of magnetic guide 56. Plug 73 could be an integral part of 42, or be separate (as shown) and secured to 42 by any suitable means, such as a tight frictional engagement.

In FIGURE 5, tank 64 has been removed from mold 42 and sealing lip 72 has been formed from plastic 37 by sawing off portion 71, which may be done by any suitable means, such as a knife (not shown), but preferably is sawed off with a small disc saw 74 of FIGURE 13, the shaft 76 of which is rotated by a motor (not shown) in the conventional manner in which saws are employed. It will be noted that tank 64 may be provided with a filling inlet 77 having external screw threads 78 adapted to receive an internally threaded cap 79. Spout 77 and threads 78 were formed by parts 52 and 53 of the mold in FIGURE 1, the end of 78 being sawed off even and cap 79, preferably made of metal, being screwed on when desired.

In FIGURE 5, tank 64 has insert 58 firmly secured in place by projections 69 and 72 extending in a position outside of shoulders 63 and 57, respectively. A metal cap generally designated as 81 is secured with a sealing flange 82, and if desired a gasket 83, in sealing contact with plastic material 72 around the periphery of the outlet passage in 57 and may be secured in place by spring fingers 84 being placed over the grooved portion of inwardly-extending arm 66 of the insert 58. So far as the present invention is concerned, cap 81 could be merely a closure member, but in a gasoline tank for an automobile it is desirable to have it serve other purposes. For example, it may be provided with a gasoline withdrawal pipe 86 having a conventional connection 87 and 88 to the fuel line 89 leading to the engine (not shown). Pipe 86 extends almost to the bottom of tank 64 with an opening at 91 to draw the gasoline out of the tank by vacuum.

It is also desirable to have an electric gasoline gauge incorporated in cap 81, comprising a gasoline float 92 movable along arc 93 at the end of a radius rod 94 perforated at 96. While not shown, it is obvious that in chamber 97 there may be an annular rheostat electrically connected to electrical connections 98 and 99 in a conventional manner with a circumferentially-movable contact on shaft 96 controlling the extent of the annular rheostat through which the electric current travels going from 98 to 99, thus varying the resistance as the function of the portion of float 92, thereby when connected in the conventional manner indicating the level of gasoline in tank 64.

Figure 7:
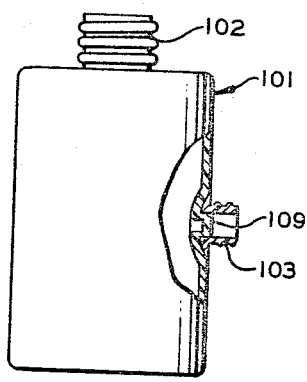
FIGURE 7 is an elevational view with parts broken away to show details of construction of a second article of manufacture made in the mold of FIGURE 6.

FIGURE 6 shows the invention applied to the manufacture out of plastic of a water jug 101 of FIGURE 7 with a screw-threaded inlet 102 and a screw-threaded side outlet 103 preferably made of plastic, although other material, such as metal, can be used. The blow mold halves 104 and 106 are closed around a cylindrical parison depending from nozzle 29 and the bubble of heated plastic is blown against insert 103 which may contain a frictionally-engaged plug 107 of clay, wood or easily-drillable plastic. Plug 103 adheres to jug body 101 by adherence on annular zone 108, or some thin film (not shown) of plastic from 101 can be forced around the edge of head 108. The central portion of plastic 109 inside fitting 103 and the plug 107 can be removed with an ice pick or corkscrew (not shown) or drilled out with core drill 111 of FIGURE 12, which may have an annular sleeve with saw teeth 113 and windows 114, provided with a shaft 116 with a suitable driving engagement portion 117 to be received in any conventional drill chuck (not shown).

Figure 8:
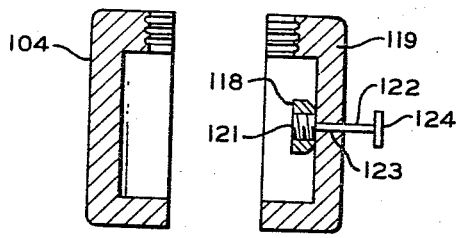
FIGURE 8 is a cross-sectional view of a third modification of the mold, insert support and insert.
Figure 10:
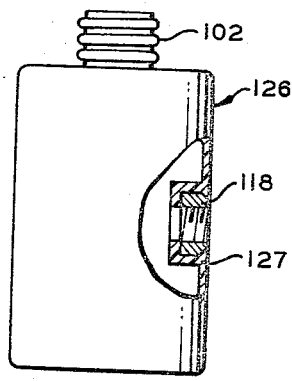
FIGURE 10 is an elevational view with parts broken away to show details of construction of a third article of manufacture made in the mold of FIGURE 8.
Figure 9:
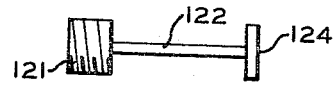
FIGURE 9 is an elevational enlarged view of the insert support of FIGURE 8.

FIGURES 8 and 9 show a modified means to hold a threaded insert 118 inside blow mold halves 104 and 119. The insert 118, which in this case is preferably metal but can be plastic or any other material such as wood or ceramic, is retained by being threaded on threaded plug 121 on the end of shaft 122 which passes through hole 123 in mold half 119 and may be provided with a handle 124. When jug 126 of FIGURE 10 is blown and cooled, the mold halves are separated and plug 121 is screwed out of insert 118 by means of handle 124. The plastic preferably extends over a shoulder of plug 118 at 127 in order to give a good grip on the insert.

Figure 11:
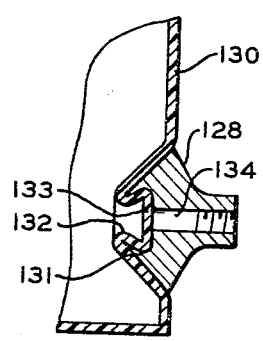
FIGURE 11 is a fragmentary sectional view of a portion of a fourth article of manufacture made in the mold of FIGURE 8.

FIGURE 11 shows a design of insert 128 held in the wall of jug 130 by means of an internal annular dovetail around shoulder 131 so that material 132 retains the insert after the material 133 directly adjacent hole 134 has been removed by using the saws of FIGURES 12 or 13 as described above.

It should be obvious from the above disclosure that the present invention is not limited to the specific embodiments shown in the drawings only for purposes of illustration.

Having described my invention, I claim:

1. A plastic container with a metal-reinforced plastic opening comprising in combination:
   a metal insert having an opening surrounded by an inwardly-extending metal lip, said insert opening being enlarged behind said metal lip;
   a plastic container with a wall in contact with the outside of said metal lip and having a portion extending through said metal lip to form an outwardly-extending plastic lip in contact with the inside of said metal lip in the enlargement of said insert opening behind said metal lip; and
   a hole through said plastic inside said insert opening to form a metal-reinforced plastic opening for said plastic container.

2. The combination of claim 1 in which the metal insert has locking means mounted behind said metal lip and spaced therefrom; and
   a closure means is secured between said locking means and said plastic for closing said metal-reinforced plastic opening.

3. The combination of claim 2 in which a gasket is provided between said closure means and said plastic lip to improve the sealing therebetween.

4. The process of making a plastic container with a metal-reinforced plastic opening, comprising the steps of:
   positioning a metal insert in a blow mold, said insert having an opening surrounded by an inwardly-extending metal lip, said opening being enlarged behind said metal lip;
   inserting a hot thermoplastic parison into said mold;
   blowing said parison out into contact with said insert so that the wall of said parison enters said insert opening and spreads out behind and in contact with said metal lip, thereby retaining said metal insert in said parison;
   cooling the parison to form a plastic container having a portion extending through said insert opening in said metal insert into the enlarged opening behind said metal lip; and
   forming a hole through the plastic container inside said insert opening to form a plastic container with a metal-reinforced plastic opening, having a plastic lip extending outwardly and overlapping said metal lip in the enlarged portion of said insert opening behind said metal lip.

5. The process of claim 4 in which the metal insert is provided with locking means behind said metal lip and spaced therefrom, comprising the additional step of:
   inserting a closure means between the plastic lip behind said metal lip and said locking means; and
   securing said closure means in a position sealed to said plastic lip of said plastic container to close said metal-reinforced plastic opening.

References Cited
UNITED STATES PATENTS

| | | | |
|---|---|---|---|
| 2,902,721 | 9/1959 | Heurr. | |
| 2,959,812 | 11/1960 | Allen | 264—98 |
| 3,101,993 | 8/1963 | Cohn | 264—98 |
| 3,140,329 | 7/1964 | Nutting | 264—274 |
| 3,263,009 | 7/1966 | Vidal | 264—98 |

THERON E. CONDON, *Primary Examiner.*

JAMES B. MARBERT, *Examiner.*